United States Patent
Lee et al.

(10) Patent No.: US 7,609,347 B2
(45) Date of Patent: Oct. 27, 2009

(54) LIQUID CRYSTAL DISPLAY AND METHOD THEREOF

(75) Inventors: Jeong-Ho Lee, Seoul (KR); Min-Wook Park, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 215 days.

(21) Appl. No.: 11/862,567

(22) Filed: Sep. 27, 2007

(65) Prior Publication Data

US 2008/0079885 A1    Apr. 3, 2008

(30) Foreign Application Priority Data

Sep. 28, 2006    (KR) .................. 10-2006-0094937

(51) Int. Cl.
*G02F 1/1337* (2006.01)
(52) U.S. Cl. .................. 349/128; 349/129; 349/130
(58) Field of Classification Search .......... 349/128–130
See application file for complete search history.

(56) References Cited

U.S. PATENT DOCUMENTS 7,505,103 B2 *   3/2009   Takeda et al. ............... 349/129

* cited by examiner

*Primary Examiner*—Richard H Kim
(74) *Attorney, Agent, or Firm*—Cantor Colburn LLP

(57) ABSTRACT

A liquid crystal display ("LCD") includes a first substrate, a second substrate, and a liquid crystal layer interposed between the first and second substrates. A pixel electrode is formed on the first substrate and provided with a first domain divider. A common electrode is formed on the second substrate and provided with a second domain divider. The second domain divider extends in a first direction and a second direction symmetric with the first direction in order to have a curved portion of the second domain divider. The common electrode has a concavo-convex portion in a saw-toothed shape in a plan view of the common electrode, and the concavo-convex portion is positioned in a region where the curved portion is formed.

20 Claims, 10 Drawing Sheets

LIQUID CRYSTAL DISPLAY AND METHOD THEREOF

This application claims priority to Korean Patent Application No. 2006-94937, filed on Sep. 28, 2006, and all benefits accruing therefrom under 35 U.S.C. §119, and the contents of which in its entirety are herein incorporated by reference.

BACKGROUND OF THE INVENTION

1. Field of the Invention

The present invention relates to a liquid crystal display ("LCD") and method thereof. More particularly, the present invention relates to an LCD having an improved viewing angle, and a method of improving a viewing angle of an LCD.

2. Description of the Related Art

In general, a liquid crystal display ("LCD") uses liquid crystals having a mesomorphic phase representing both liquid and solid properties to display an image. The LCD has two substrates and a liquid crystal layer including the liquid crystals interposed between the two substrates.

When an electric field is applied to the liquid crystals, an alignment of the liquid crystals is changed and light transmittance of the LCD varies according to the alignment of the liquid crystals. The LCD controls the electric field to align the liquid crystals, so that a desired image is displayed thereon.

In a conventional display apparatus, an image quality when viewed at a position in front of the display apparatus is superior to that when viewed at a position in a lateral side of the display apparatus. The LCD has a narrower viewing angle than that of the conventional display apparatus, which allows a user to properly view a displayed image. As a result, the image when viewed at the position in the lateral side of the LCD is extremely distorted in comparison with the image when viewed at the position in front of the LCD, thereby causing deterioration of the image quality of the LCD.

BRIEF SUMMARY OF THE INVENTION

The present invention provides a liquid crystal display ("LCD") capable of widening a viewing angle and improving an image quality.

The present invention also provides a method of improving a viewing angle of an LCD.

In exemplary embodiments of the present invention, an LCD includes a first substrate, a second substrate, a liquid crystal layer, a gate line and a data line, a pixel electrode, and a common electrode. The first substrate has a pixel area. The second substrate faces the first substrate. The liquid crystal layer is interposed between the first and second substrates. The gate line and the data line are arranged on the first substrate and cross each other. The pixel electrode is positioned in the pixel area and provided with a first domain divider. The common electrode is arranged on the second substrate and provided with a second domain divider. The first and second domain dividers divide the pixel area into a plurality of domains.

The second domain divider extends in a first direction and a second direction symmetric with the first direction with respect to a longitudinal direction of the gate line in order to have a curved portion of the second domain divider. The common electrode has a concavo-convex portion in a saw-toothed shape in a plan view of the common electrode, and the concavo-convex portion is positioned in a region where the curved portion is formed.

The concavo-convex portion may be formed in a region where an included angle between the first direction and the second direction is greater than 180 degrees.

The first domain divider may be spaced apart from the second domain divider, and portions of the first domain divider may extend substantially parallel to portions of the second domain divider in order to have a curved portion of the first domain divider. The pixel electrode may have a concavo-convex portion in a saw-toothed shape in a plan view of the pixel electrode, and the concavo-convex portion may be positioned corresponding to the curved portion of the first domain divider.

The concavo-convex portion of the common electrode and the concavo-convex portion of the pixel electrode may be alternately arranged with each other. Alternatively, the concavo-convex portion of the common electrode and the concavo-convex portion of the pixel electrode may be arranged to an end portion of the first and second domain dividers, respectively.

The LCD may include a storage electrode and a transparent insulating layer pattern. The storage electrode may be spaced apart from the gate line and overlapped with the curved portion of the second domain divider in a plan view of the LCD. The transparent insulating layer pattern may be arranged between the data line and the pixel electrode, and is partially opened in an area corresponding to the storage electrode. The concavo-convex portion may be successively formed along an area corresponding to the storage electrode to an area corresponding to an end portion of the storage electrode.

The first domain divider may be defined by a cut-out section obtained by removing a portion of the pixel electrode. The second domain divider may be defined by a cut-out section obtained by removing a portion of the common electrode. Alternatively, the second domain divider may be defined by a protrusion formed on a portion of the common electrode.

In a plan view of the LCD, a distance between the first domain divider and a convex portion of the concavo-convex portion of the second domain divider may be less than a distance between the first domain divider and a concave portion of the concavo-convex portion of the second domain divider.

A convex portion of the concavo-convex portion supplements a controlling force of the second domain divider over liquid crystals in the liquid crystal layer and a concave portion of the concavo-convex portion increases an aperture ratio of the LCD.

In other exemplary embodiments of the present invention, a method of improving a viewing angle of an LCD includes forming a first domain divider in a pixel electrode, forming a second domain divider in a common electrode, the second domain divider spaced from the first domain divider in a plan view of the LCD, the second domain divider having a first portion extending in a first direction and a second portion extending in a second direction, the second portion meeting the first portion at a curved portion of the second domain divider, forming a concavo-convex portion in the common electrode at least at a region corresponding to the curved portion of the second domain divider, wherein a convex portion of the concavo-convex portion supplements a controlling force of the second domain divider over liquid crystals in the LCD and a concave portion of the concavo-convex portion increases an aperture ratio of the LCD.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

Figure 1:
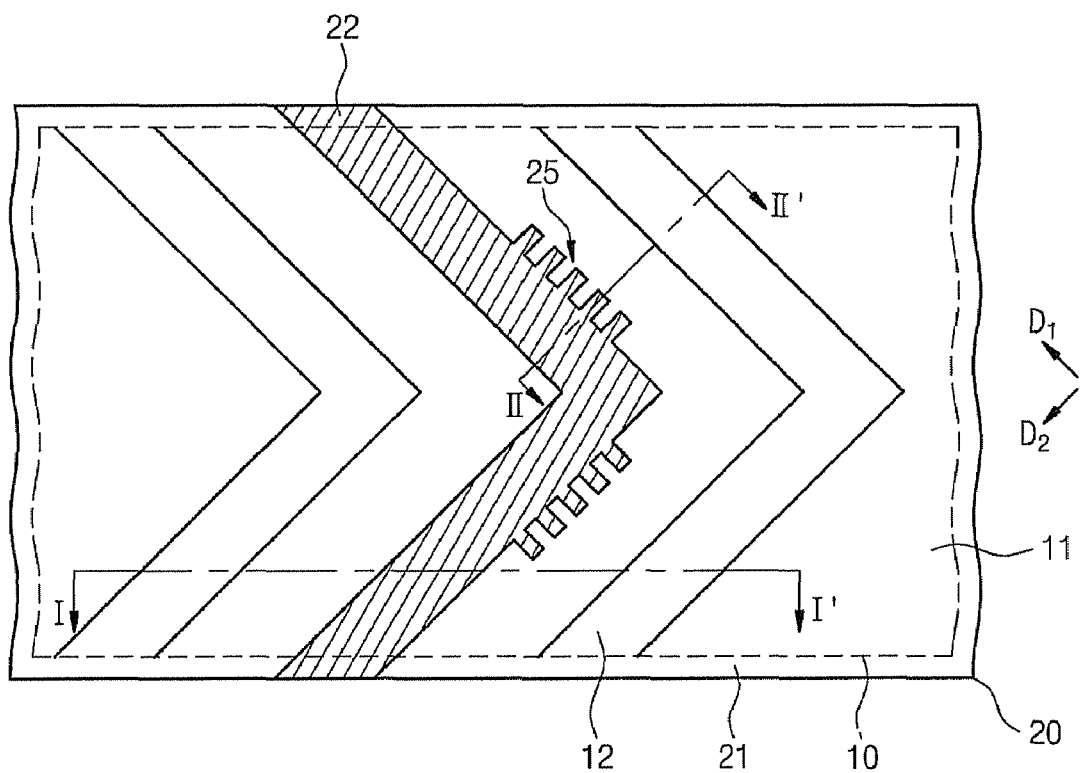
FIG. 1 is a plan view illustrating an exemplary embodiment of a liquid crystal display ("LCD") according to the present invention.

Hereinafter, exemplary embodiments of the present invention will be explained in detail with reference to the accompanying drawings. However, the scope of the present invention is not limited to such embodiments and the present invention may be realized in various forms. The embodiments to be described below are nothing but the ones provided to bring the disclosure of the present invention to perfection and assist those skilled in the art to completely understand the present invention. The present invention is defined only by the scope of the appended claims. In addition, the size of layers and regions shown in the drawings can be simplified or magnified for the purpose of clear explanation. Also, the same reference numerals are used to designate the same elements throughout the drawings.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

FIG. 1 is a plan view illustrating an exemplary embodiment of a liquid crystal display ("LCD") according to the present invention.

Referring to FIG. 1, the LCD includes a first substrate 10 and a second substrate 20 facing the first substrate 10. Pixel areas are defined on the first substrate 10 to display an image thereon. In FIG. 1, since the pixel areas have a same structure and function, hereinafter, only one pixel area has been illustrated as an example of the present exemplary embodiment.

The first substrate 10 includes a pixel electrode 11 formed thereon and arranged in each of the pixel areas. The second substrate 20 includes a common electrode 21 formed thereon to cover a whole surface, or substantially an entire surface, of the second substrate 20.

The pixel electrode 11 is provided with a first domain divider 12 and the common electrode 21 is provided with a second domain divider 22. The first and second domain dividers 12 and 22 are spaced apart from each other in the plan view of the LCD. Each of the first and second domain dividers 12 and 22 extends in a first direction D1 and a second direction D2. The first and second directions D1 and D2 are inclined relative to a horizontal direction and symmetrical with each other with respect to the horizontal direction. As an example of the present exemplary embodiment, the inclined angle of the first and second domain dividers 12 and 22 is in a range of about ±45 degrees with reference to the horizontal direction, such that each of the first and second domain dividers 12 and 22 is bent at an angle in a range of about ±90 degrees.

The second domain divider 22 includes a first portion extending in the first direction D1 and a second portion extending in the second direction D2, and the second domain divider 22 is curved at a position where the first and second portions meet with each other. In other words, the first portion and the second portion of the second domain divider 22 meet at an angle. Hereinafter, the position where the first and second portions meet with each other is defined as a curved portion. The common electrode 21 includes a concavo-convex portion 25 in a saw-toothed shape when viewed from a plan view, which is positioned corresponding to the curved portion of the second domain divider 22.

Figure 2A:
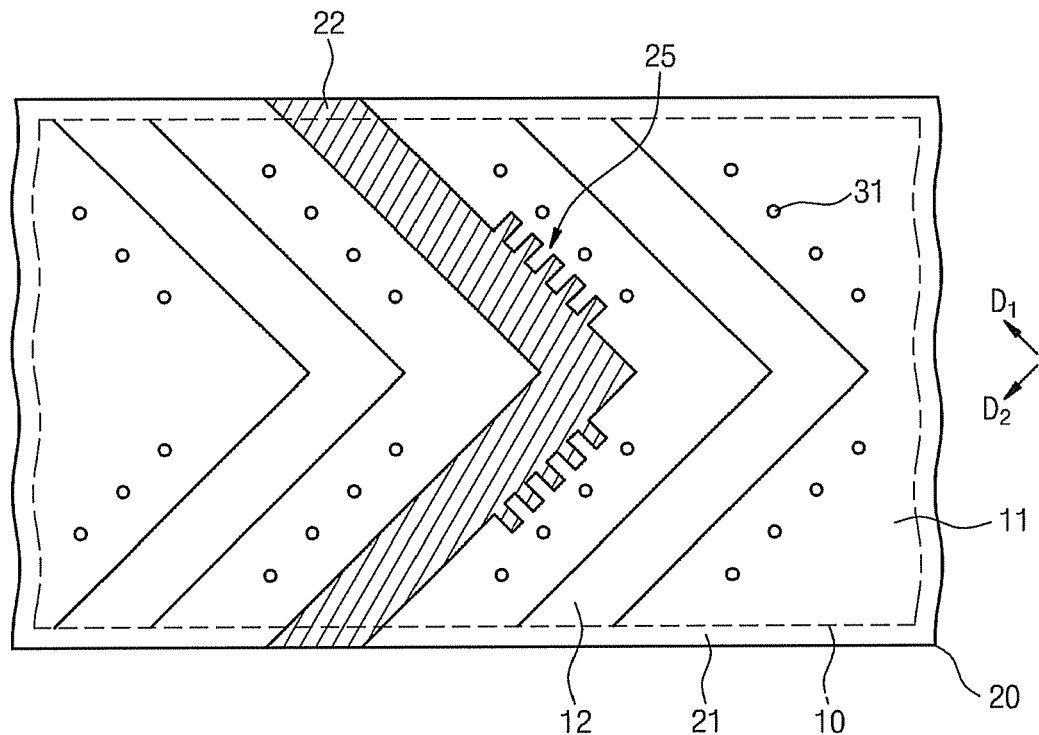
FIGS. 2A and 2B are plan views illustrating an operation of the exemplary LCD of FIG. 1.
Figure 2B:
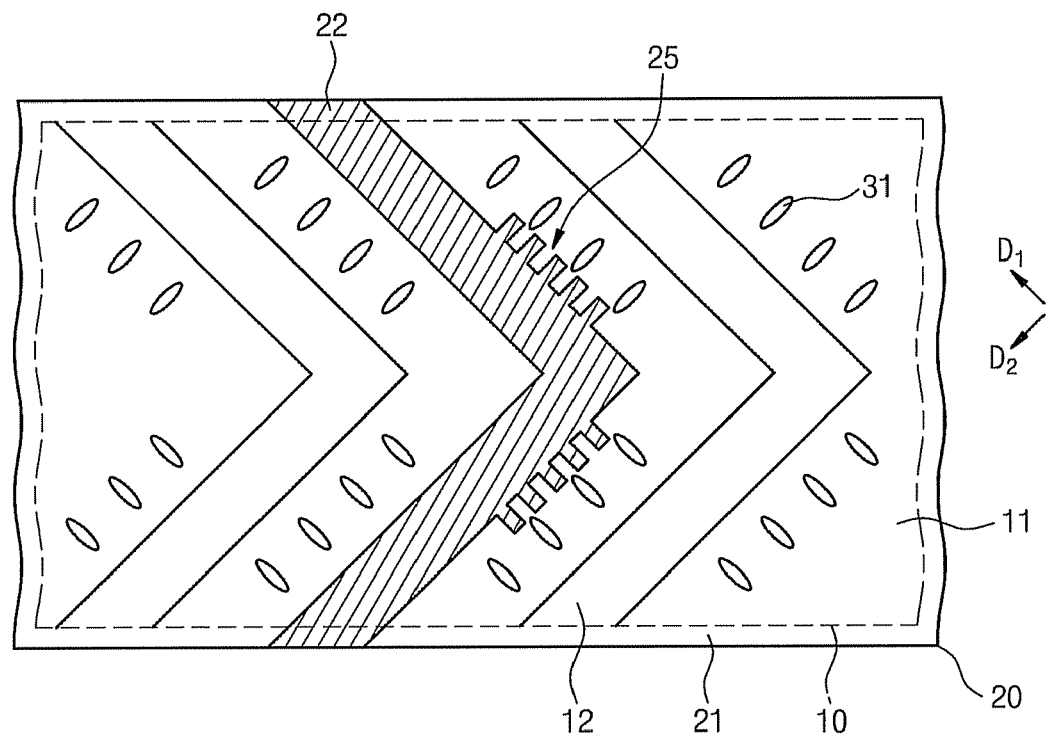

FIGS. 2A and 2B are plan views illustrating an operation of the exemplary LCD of FIG. 1.

Referring to FIG. 2A, liquid crystals 31 are aligned between the first and second substrates 10 and 20. The liquid crystals 31 have an oval shape with a long axis and a short axis, and an alignment of the liquid crystals 31 is defined by a direction of the long axis. The liquid crystals 31 are vertically aligned with respect to the first and second substrates 10 and 20.

Under this alignment state, the liquid crystals 31 do not exert any optical effect on a light passing therethrough, so that a phase of the light is maintained while the light passes through the liquid crystals 31. The first and second substrates 10 and 20 are attached with first and second polarizing plates (not shown) on their external surfaces, respectively, such that axes of the first and second polarizing plates are substantially perpendicular to each other. Therefore, the light is linearly polarized by the first polarizing plate attached to the first substrate and is absorbed by the second polarizing plate attached to the second substrate after passing through the liquid crystals 31. As a result, the LCD becomes a black state.

Referring to FIG. 2B, the LCD applies a data voltage corresponding to an image displayed to the pixel electrode 11. In addition, the LCD applies a constant common voltage to the common electrode 21. Due to a voltage difference between the data voltage and the common voltage, an electric field is established between the first and second substrates 10 and 20. The liquid crystals 31 have a dielectric anisotropy, and are aligned in an inclined direction with respect to the first and second substrates 10 and 20 by the electric field.

When the liquid crystals 31 are aligned as described above, a phase of the light is shifted due to the liquid crystals 31 being inclined relative to the first and second substrates 10 and 20 while the light passes through the liquid crystals 31. The phase-shifted light may pass through the second polarizing plate to display an image. During this operation, an intensity of the light passing through the second polarizing plate varies according to the inclined angle of the liquid crystals 31, and the inclined angle of the liquid crystals 31 is adjusted by controlling an intensity of the electric field.

Figure 3:
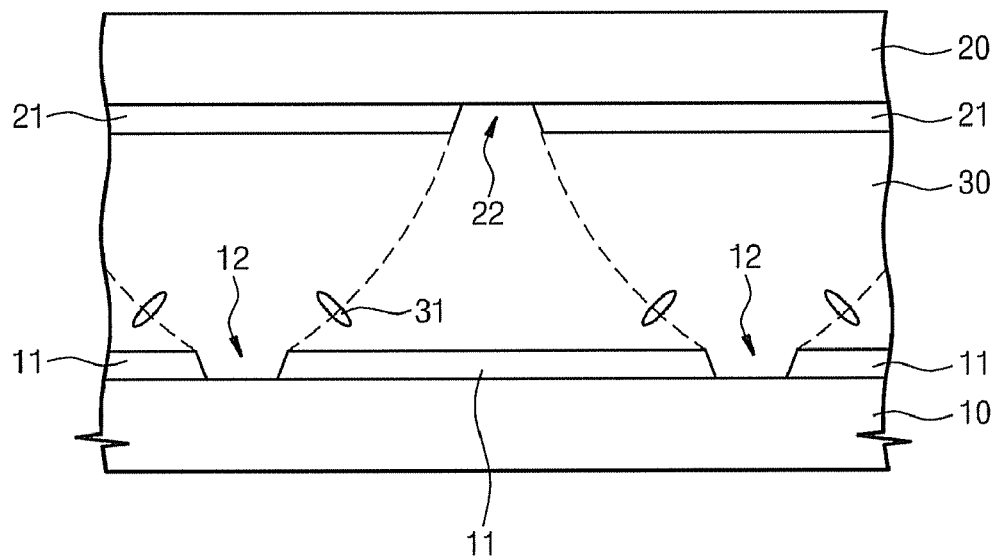
FIG. 3 is a cross-sectional view taken along line I-I' shown in FIG. 1.

FIG. 3 is a cross-sectional view taken along line I-I' shown in FIG. 1.

Referring to FIG. 3, the LCD includes a liquid crystal layer 30 having the liquid crystals 31 interposed between the first and second substrates 10 and 20. The first domain divider 12 is defined by a cut-out section obtained by removing a predetermined portion of the pixel-electrode 11. The second domain divider 22 is defined by a cut-out section obtained by removing a predetermined portion of the common electrode 21. Since the data voltage or the common voltage can not be applied to the cut-out sections of the pixel electrode 11 and the common electrode 21, changes in the intensity and the direction of the electric field established between the pixel electrode 11 and the common electrode 21 are established.

As illustrated by dashed lines in FIG. 3, the electric field changed by the cut-out sections is formed along with a line connecting the first and second domain dividers 12 and 22 adjacent to each other. The electric field in a left-side region of the first domain divider 12 (or the second domain divider 22) is different from the electric field in a right-side region of the first domain divider 12 (or the second domain divider 22). The liquid crystals 31 are aligned substantially perpendicular to the direction of the electric field. Therefore, the alignment of the liquid crystals 31 in the left-side region of the first domain divider 12 (or the second domain divider 22) is different from the alignment of the liquid crystals 31 in the right-side region of the first domain divider 12 (or the second domain divider 22).

If the pixel area is divided into plural pixel regions according to the alignment of the liquid crystals 31 and each pixel region is defined as a domain, the pixel area is divided into plural domains by the first and second domain dividers 12 and 22. Since the liquid crystals 31 are differently aligned in each domain, optical characteristics of the domains may be compensated with each other to widen the viewing angle of the LCD.

Figure 4:
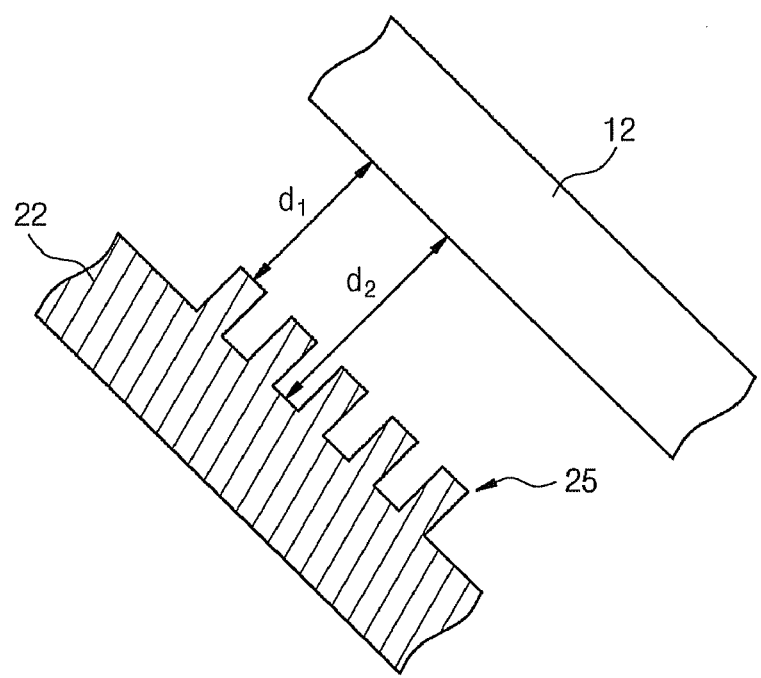
FIG. 4 is an enlarged view of an area in which an exemplary concavo-convex portion is formed in FIG. 1.

FIG. 4 is an enlarged view of an area in which an exemplary concavo-convex portion is formed in FIG. 1.

Referring to FIG. 4, the common electrode 21 includes the concavo-convex portion 25 which is positioned corresponding to the second domain divider 22. The concavo-convex portion 25 has the saw-toothed shape, and the saw-toothed shape may include various shapes protruding from the second domain divider 22 towards the first domain divider 12 adjacent to the second domain divider 22. For example, as illustrated in FIG. 4, the saw-toothed shape may have a rectangular shape. Although not illustrated in FIG. 4, the saw-toothed shape may alternatively have a triangular shape, a circular shape, etc.

The concavo-convex portion 25 changes a distance between the first and second domain dividers 12 and 22. If a protruding portion and a recessed portion of the concavo-convex portion 25 are defined as a convex portion and a concave portion, respectively, a first distance d1 between the first domain divider 12 and the convex portion of the second domain divider 22 is shorter than a second distance d2 between the first domain divider 12 and the concave portion of the second domain divider 22.

Respective portions of the first and second domain dividers 12 and 22 extend substantially parallel to each other. The protruding direction of the convex portion is perpendicular to the extending direction of the first and second domain dividers 12 and 22. In an exemplary embodiment, if a first portion of the second domain divider 22 extends in the second direction D2, then the convex portion protruding from the first portion of the second domain divider 22 extends in the first direction D1, and if a second portion of the second domain divider 22 extends in the first direction D1, then the convex portion protruding from the second portion of the second domain divider 22 extends in the second direction D2. In the illustrated exemplary embodiment, the first and second distances d1 and d2 are constant. Since the liquid crystals 31 are successively aligned between the first and second domain dividers 12 and 22 adjacent to each other to define a predetermined domain, a width of the predetermined domain is dependent on the first and second distances d1 and d2.

Figure 5:
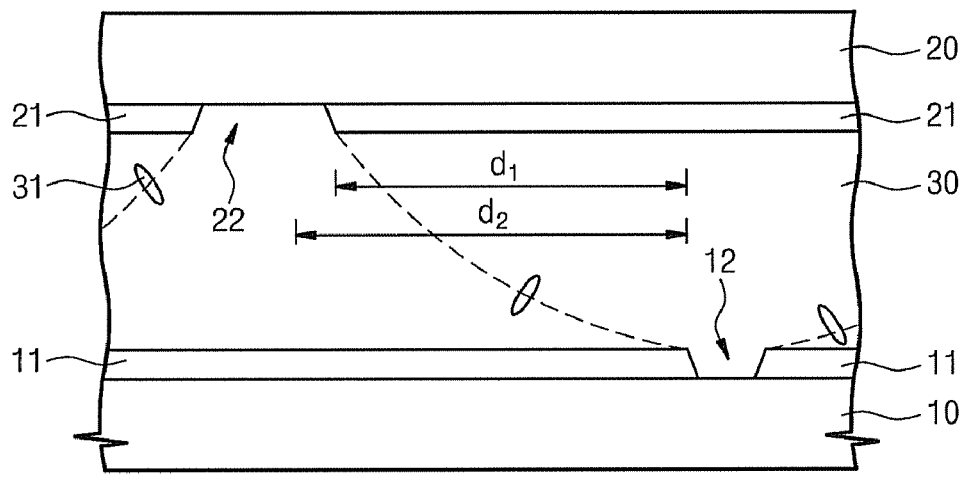
FIG. 5 is a cross-sectional view taken along line II-II' shown in FIG. 1.

FIG. 5 is a cross-sectional view taken along line II-II' shown in FIG. 1.

Referring to FIG. 5, the width of the domain at a position corresponding to the convex portion is defined by the first distance d1 between the first domain divider 12 and the convex portion of the concavo-convex portion 25 of the second domain divider 22, and the width of the domain at a position corresponding to the concave portion is defined by the second distance d2 between the first domain divider 12 and the concave portion of the concavo-convex portion 25 of the second domain divider 22.

If the first and second domain dividers 12 and 22 are positioned closely to the liquid crystals 31, a controlling force for aligning the liquid crystals 31 by the first and second domain dividers 12 and 22 (hereinafter, referred to as the controlling force) is gradually increased. Therefore, when the width of the domain becomes narrower, the controlling force becomes stronger, so that the liquid crystals 31 are uniformly aligned. If the width of the domain is too wide, there exist some liquid crystals 31 that are too far from the first and second domain dividers 12 and 22. The controlling force may not reach to the some liquid crystals 31. As a result, some liquid crystals 31 are not uniformly aligned, thereby causing deterioration of the image quality of the LCD.

In order to reduce the width of the domain, there needs to be a lot of the first and second domain dividers 12 and 22. Since the first and second domain dividers 12 and 22 are defined by cut-out sections of the pixel electrode 11 and the common electrode 21, respectively, an area of the pixel electrode 11 and the common electrode 21 is decreased when increasing the number of the first and second domain dividers 12 and 22. Therefore, it is preferable that the number of the first and second domain dividers 12 and 22 is decreased in order to increase the aperture ratio.

According to the present exemplary embodiment, both the controlling force, such as may be accomplished by a narrower domain, and the aperture ratio, such as may be accomplished by reducing a number of first and second domain dividers 12 and 22, are satisfied by using the concavo-convex portion 25 that includes the convex portion supplementing the controlling force and the concave portion maintaining the aperture ratio. The aperture ratio is thus increased by the concave portions of the concavo-convex portion 25 as compared to not having the concave portions and thus having only a wider second domain divider 22, or as compared to providing additional domain dividers.

Referring again to FIG. 1, the concavo-convex portion 25 is limited within a region corresponding to the curved portion of the second domain divider 22. As described above, the curved portion is a region defined by an intersecting area of first and second portions of the second domain divider 22, where the first and second portions extend in different directions D1 and D2. As also described above, the liquid crystals 31 are aligned in the direction substantially perpendicular to the first direction D1 by the first portion of the second domain divider 22 extending in the first direction D1 and aligned in the direction substantially perpendicular to the second direction D2 by the second portion of the second domain divider 22 extending in the second direction D2. Since the first portion is adjacent to the second portion in the curved region of the second domain divider 22, the controlling force by the first portion interferes with the controlling force by the second portion. As a result, the liquid crystals 31 may not be uniformly aligned in the curved region of the second domain divider 22, to thereby cause the deterioration of the image quality of the LCD. However, according to the present exemplary embodiment, the concavo-convex portion 25 may supplement the controlling force in the curved region to maintain the image quality.

Figure 6:
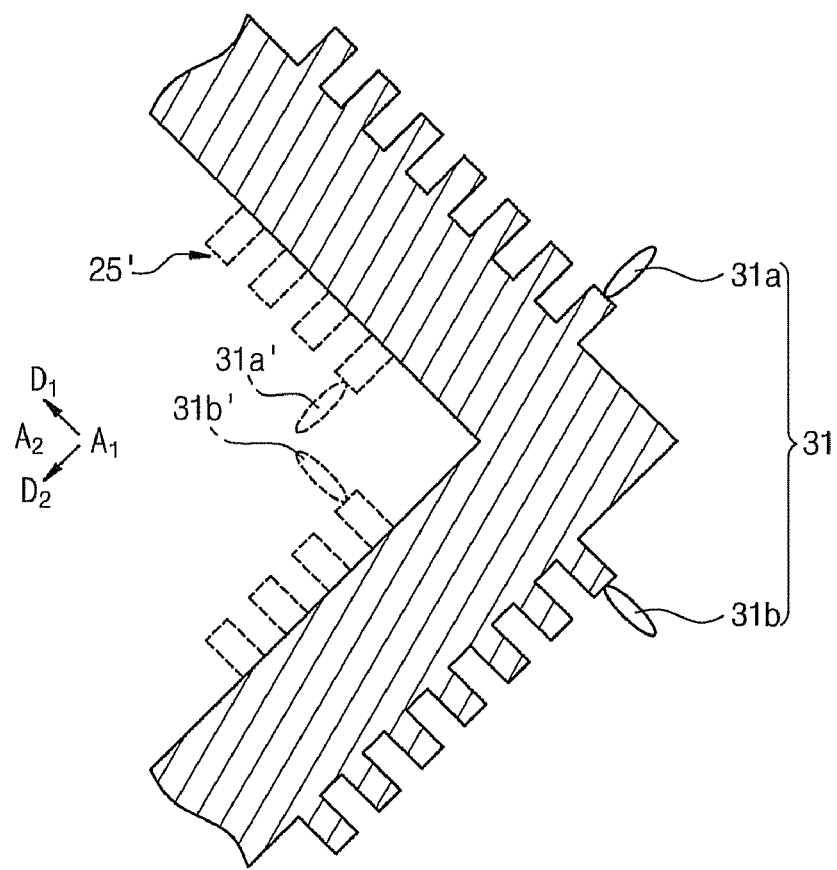
FIG. 6 is an enlarged view of an area in which an exemplary curved portion is formed in FIG. 1.

FIG. 6 is an enlarged view of an area in which the exemplary curved portion is formed in FIG. 1.

In FIG. 6, among two regions defined by intersecting the first portion and the second portion, the region where the included angle between the first and second portions is greater than 180 degrees is defined as a first region A1, and a region where the included angle between the first and second portions is less than 180 degrees is defined as a second region A2.

The concavo-convex portion 25 may be formed at the first region A1 and/or at the second region A2. However, in order to prevent the decrease of the aperture ratio by the concavo-convex portion 25, it is preferable that the concavo-convex portion 25 is formed at only one region of the first and second regions A1 and A2. In this case, providing the concavo-convex portion 25 at the first region A1 is a better choice than providing the concavo-convex portion 25' at the second region A2 as described below.

If the concavo-convex portion 25' is formed in the second region A2 and the first and second directions D1 and D2 are substantially perpendicular to each other, liquid crystals 31a' adjacent to the second portion are aligned in the second direction D2. In addition, liquid crystals 31b' adjacent to the first portion are aligned in the first direction D1. As a result, the liquid crystals 31a' aligned in the second direction D2 and the liquid crystals 31b' aligned in the first direction D1 interfere with each other towards an intersection of first and second portions of the second domain divider 22 because the second region A2 has a structure gradually narrowed toward the curved region of the second domain divider 22. Therefore, an operation of the concavo-convex portion 25' against the liquid crystals 31a' and 31b' may be deteriorated in the second region A2.

On the contrary, in the first region A1, the liquid crystals 31a aligned in the second direction D2 and the liquid crystals 31b aligned in the first direction D1 do not interfere with each other since the first region A1 has a structure that is more widely spread than the second region A2. Therefore, the operation of the concavo-convex portion 25 may be properly maintained.

Figure 7:
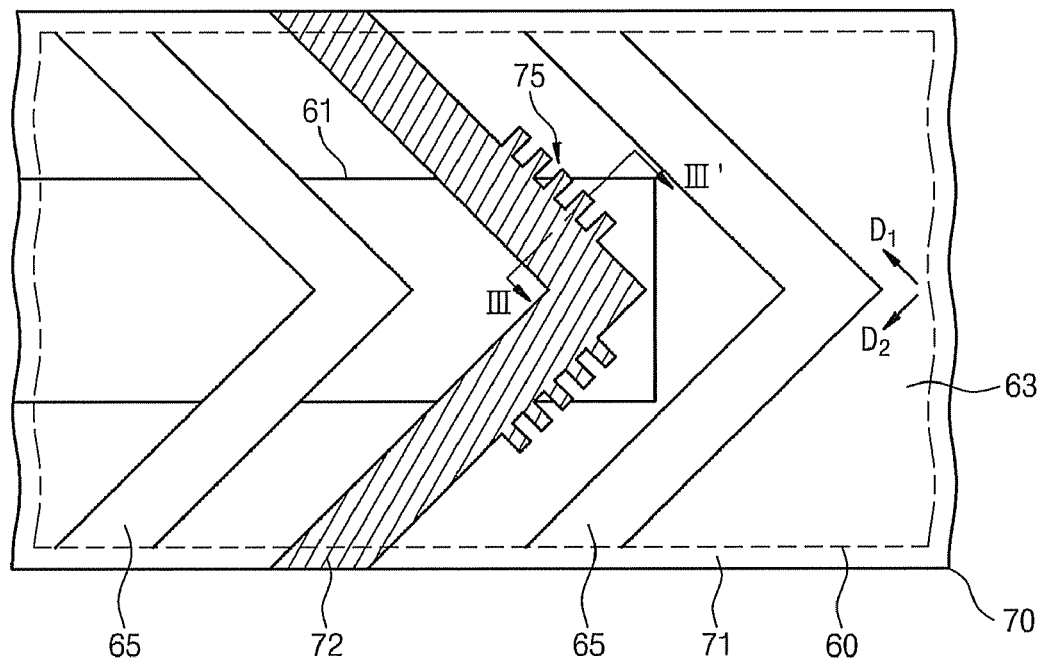
FIG. 7 is a plan view illustrating another exemplary embodiment of an LCD according to the present invention.

FIG. 7 is a plan view illustrating another exemplary embodiment of an LCD according to the present invention.

Referring to FIG. 7, the LCD includes a first substrate 60 and a second substrate 70 facing the first substrate 60. Pixel areas having a same structure and function are defined on the first substrate 60. The first substrate 60 includes a storage electrode 61 and a pixel electrode 63 formed thereon and arranged in each pixel area. The storage electrode 61 is formed between the first substrate 60 and the pixel electrode 63. The second substrate 70 includes a common electrode 71 formed thereon and corresponding to the pixel electrode 63. The pixel electrode 63 is provided with a first domain divider 65 and the common electrode 71 is provided with a second domain divider 72 spaced apart from the first domain divider 65 in a plan view of the LCD.

Each of the first and second domain dividers 65 and 72 extends in a first direction D1 and a second direction D2 that are inclined relative to a horizontal direction and symmetrical with each other with respect to the horizontal direction. The second domain divider 72 includes a first portion extending in the first direction D1 and a second portion extending in the second direction D2, and the second domain divider 72 is curved at a position where the first and second portions meet with each other. The common electrode 71 includes a concavo-convex portion 75 in a saw-toothed shape when viewed from a plan view, which is positioned corresponding to the curved portion of the second domain divider 72. The concavo-convex portion 75 is successively formed relative to an end portion of the storage electrode 61 along the storage electrode 61. In other words, a location of the curved portion of the second domain divider 72 overlaps a location of the storage electrode 61.

Figure 8:
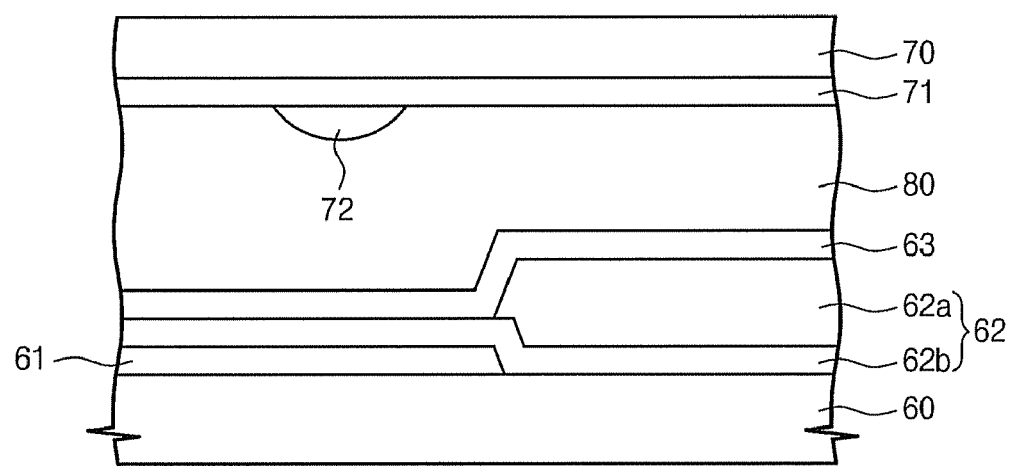
FIG. 8 is a cross-sectional view taken along line III-III' shown in FIG. 7.

FIG. 8 is a cross-sectional view taken along line III-III' shown in FIG. 7.

Referring to FIG. 8, the LCD includes a liquid crystal layer 80 interposed between the first and second substrates 60 and 70. The liquid crystal layer 80 includes liquid crystals (not shown). The first substrate 60 includes a transparent insulating layer pattern 62 arranged between the storage electrode 61 and the pixel electrode 63. The transparent insulating layer pattern 62 includes a first transparent insulating layer pattern 62a and a second transparent insulating layer pattern 62b. The first transparent insulating layer pattern 62a has a thickness thicker than that of the second transparent insulating layer pattern 62b. The first transparent insulating layer pattern 62a may be disposed between the pixel electrode 63 and the second transparent insulating layer pattern 62b, and the second transparent insulating layer pattern 62b may be disposed between the pixel electrode 63 and the storage electrode 61 in an area of the storage electrode 61 and between the first transparent insulating layer pattern 62a and the first substrate 60 in an area outside of the storage electrode 61. The first transparent insulating layer pattern 62a includes an organic material and the second transparent insulating layer pattern 62b includes an inorganic material. The storage electrode 61, the pixel electrode 63, and the transparent insulating layer pattern 62 form a storage capacitor.

The storage capacitor maintains a data voltage applied to the pixel electrode 63 for a predetermined time. At this operation, in accordance with having a high capacitance, the storage capacitor may maintain the data voltage for a longer time. The storage capacitor may have the high capacitance in accordance with thinning of the transparent insulating layer pattern 62. In order to decrease the thickness of the transparent insulating layer pattern 62, the first transparent insulating layer pattern 62a is removed from a region corresponding to the storage electrode 61.

The second domain divider 72 is defined by a protrusion including an insulating material to which a common voltage cannot be applied. The protrusion changes an intensity and a direction of the electric field established between the pixel electrode 63 and the common electrode 71. Therefore, an operation of the protrusion is identical to, or at least substantially the same as, that of the cut-out section of the previously described embodiment.

The pixel electrode 63 has a stepped portion corresponding to the storage electrode 61 where the first transparent layer pattern 62a is opened. An alignment of the liquid crystals within the liquid crystal layer 80 is affected by a surface shape of the stepped portion. As a result, a controlling force for alignment of the liquid crystals by the first and second domain dividers 65 and 72 is reduced.

In addition, a distance between the pixel electrode 63 and the common electrode 71 is increased by the lack of the first transparent layer pattern 62a in a region corresponding to the storage electrode 61. The electric field applied to the liquid crystals is also reduced in that area, so that the controlling force generated by the first and second domain dividers 65 and 72 is weakened. Since the second domain divider 72 is positioned farther from the opened area of the fist transparent insulating layer pattern 62a adjacent the storage electrode 61 than the first domain divider 65, the controlling force generated by the second domain divider 72 is weakened more than the controlling force generated by the first domain divider 65.

As described above, the concavo-convex portion 75 of the common electrode 71 supplements the controlling force generated by the second domain divider 72. Therefore, if the concavo-convex portion 75 is formed on an area of the common electrode 71 corresponding to the opened area, the controlling force by the second domain divider 72 may be supplemented.

The concavo-concave portion 75 is successively formed from the curved portion to an area corresponding to the end portion of the storage electrode 61 in order to supplement the controlling force in two different aspects. That is, the concavo-convex portion 75 may supplement the controlling force in the curved portion of the second domain divider 72 and prevent the controlling force from being weakened in the opened area of the first transparent layer pattern 62a.

According to the exemplary embodiment shown in FIGS. 7 and 8, and the previous described embodiment shown in FIGS. 1 to 6, the second domain dividers 22 and 72 are defined by the cut-out section and the protrusion, respectively. On the contrary, the first domain dividers 12 and 65 are defined by only the cut-out section. In alternative exemplary embodiments, the first domain dividers 12 and 65 and the second domain divider 22 may be defined by a protrusion such as the second domain divider 72. However, it is preferable that the first domain dividers 12 and 65 are defined by the cut-out section when considering the fabrication process. The pixel electrodes 11 and 63 are formed through a patterning process to be separated corresponding to the pixel areas. The cut-out section of the first domain dividers 12 and 65 may be formed together when the pixel electrodes 11 and 63 are formed through the same patterning process. However, in the case of forming the protrusion, an additional patterning process is necessary to form the protrusion after forming the pixel electrodes 11 and 63 through the patterning process. Therefore, the first domain dividers 12 and 65 are defined by the cut-out section in order to decrease the number of patterning processes.

Figure 9:
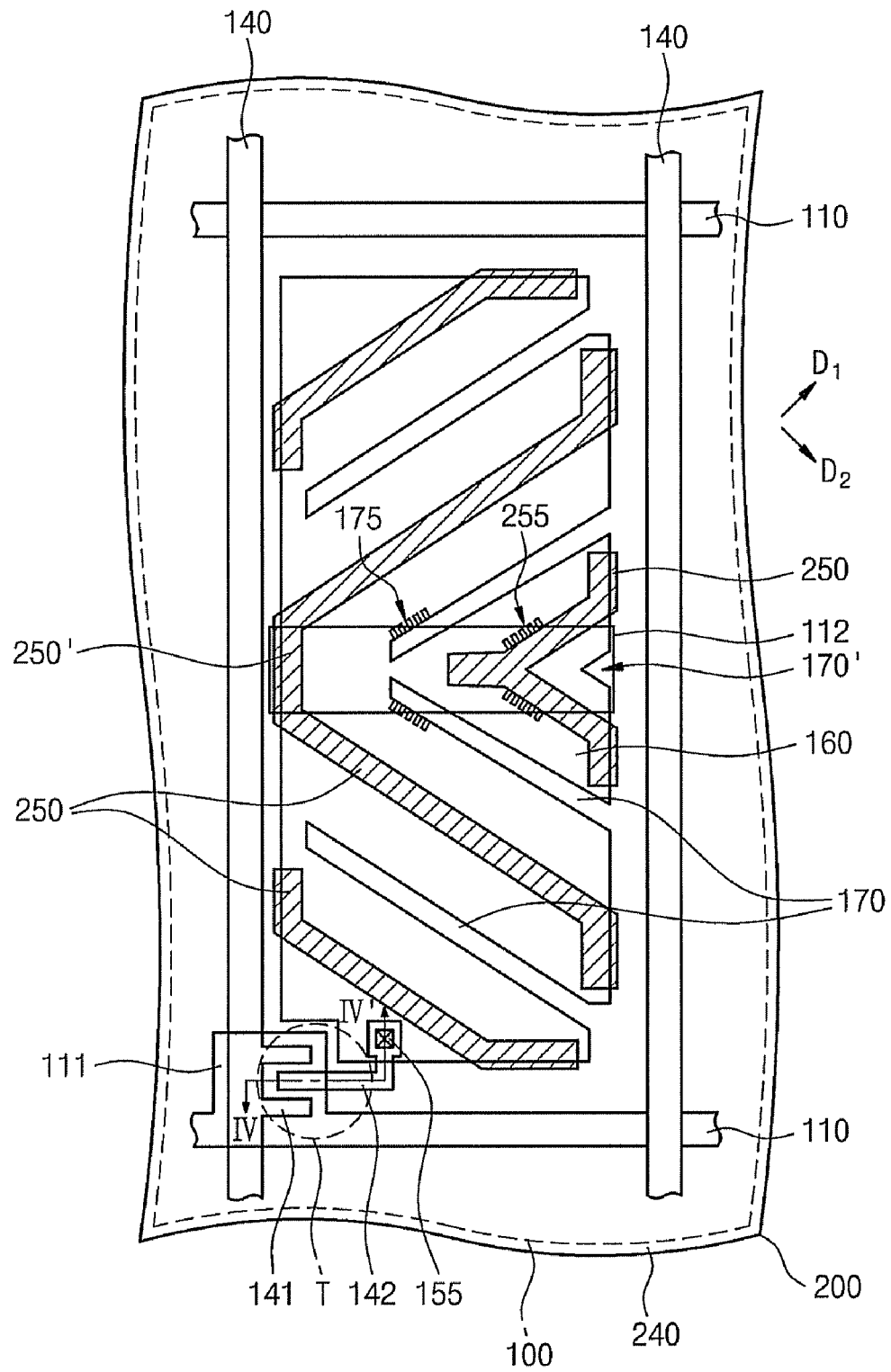
FIG. 9 is a plan view illustrating another exemplary embodiment of an LCD according to the present invention.

FIG. 9 is a plan view illustrating another exemplary embodiment of an LCD according to the present invention.

Referring to FIG. 9, the LCD includes a first substrate 100 and a second substrate 200 facing the first substrate 100. The first substrate 100 includes a plurality of signal lines formed thereon. The signal lines include a gate line 110 and a data line 140. The gate line 110 extends substantially parallel to a horizontal direction. The data line 140 extends substantially parallel to a vertical direction. The gate line 110 and the data line 140 may be substantially perpendicular to each other and cross each other. In an exemplary embodiment, the gate line 110 and the data line 140 may define a pixel area. Although only one pixel area is illustrated in FIG. 9, plural pixel areas having a same structure and function are defined on the first substrate 100. The first substrate 100 includes a thin film transistor ("TFT") 'T', a storage electrode 112, and a pixel electrode 160 arranged in each pixel area.

The TFT 'T' includes a gate electrode 111, a source electrode 141, and a drain electrode 142. The gate electrode 111 branches from the gate line 110. The source electrode 141 branches from the data line 140. The drain electrode 142 is spaced apart from the source electrode 141 and electrically connected with the pixel electrode 160 through a contact hole 155.

The LCD applies operational signals to the gate line 110 and the data line 140, so that a data voltage is applied to the pixel electrode 160. The storage electrode 112 and the pixel electrode 160 facing the storage electrode 112 form a storage capacitor. The storage capacitor maintains the data voltage for a predetermined time.

The second substrate 200 includes a common electrode 240 formed thereon. The pixel electrode 160 and the common electrode 240 are provided with a first domain divider 170 and a second domain divider 250, respectively. The second domain divider 250 is spaced apart from the first domain divider 170 in a plan view and has portions extending substantially parallel to portions of the first domain divider 170 except for a predetermined portion that is substantially parallel to the gate line 110 or the data line 140. The predetermined portion prevents the liquid crystals from not uniformly aligning at a fringe of the pixel area where an electric field may be distorted by a lateral electric field generated between two adjacent pixel areas.

The pixel area is divided into two equal sections by a virtual line (not shown) substantially parallel to a longitudinal direction of the gate line 110. The first and second domain dividers 170 and 250 extend in first and second directions D1 and D2, respectively, inclined to the virtual line and symmetrical with each other with respect to the virtual line. The first and second directions D1 and D2 may extend about ±45 degrees with respect to the virtual line.

Each of the first and second domain dividers 170 and 250 includes a first portion extending in the first direction D1 and a second portion extending in the second direction D2. The pixel electrode 160 includes a first concavo-convex portion 175 formed at a position where the first portion of the first domain divider 170 is adjacent to the second portion of the first domain divider 170. The common electrode 240 includes a second concavo-convex portion 255 formed at a position where the first portion of the second domain divider 250 meets with the second portion of the second domain divider 250.

The first concavo-convex portion 175 supplements a controlling force for alignment of the liquid crystals by the first domain divider 170. The second concavo-convex portion 255 supplements a controlling force for alignment of the liquid crystals by the second domain divider 250.

The first and second concavo-convex portions 175 and 255 are formed in a region where an included angle between the first direction D1 and the second direction D2 is greater than 180 degrees in order to strengthen the controlling force. In addition, the first and second concavo-convex portions 175 and 255 are successively formed in an area of the pixel electrode 160 and the common electrode 240 where the first domain divider 170 and the second domain divider 250 overlap an end portion of the storage electrode 112 to supplement the controlling force at an area corresponding to the storage electrode 112.

Meanwhile, the first concavo-convex portion 175 or the second concavo-convex portion 255 is not necessary to be formed at all positions where the first portion is adjacent to the second portion or the first portion meets with the second portion. For example, the first concavo-convex portion 175 may not be formed if a first domain divider 170' is positioned in an area that is too narrow to form the first concavo-convex portion 175. Further, the second concavo-convex portion 255 may not be formed if first and second portions of a predetermined second domain divider 250' are sufficiently spaced apart from each other.

Figure 10:
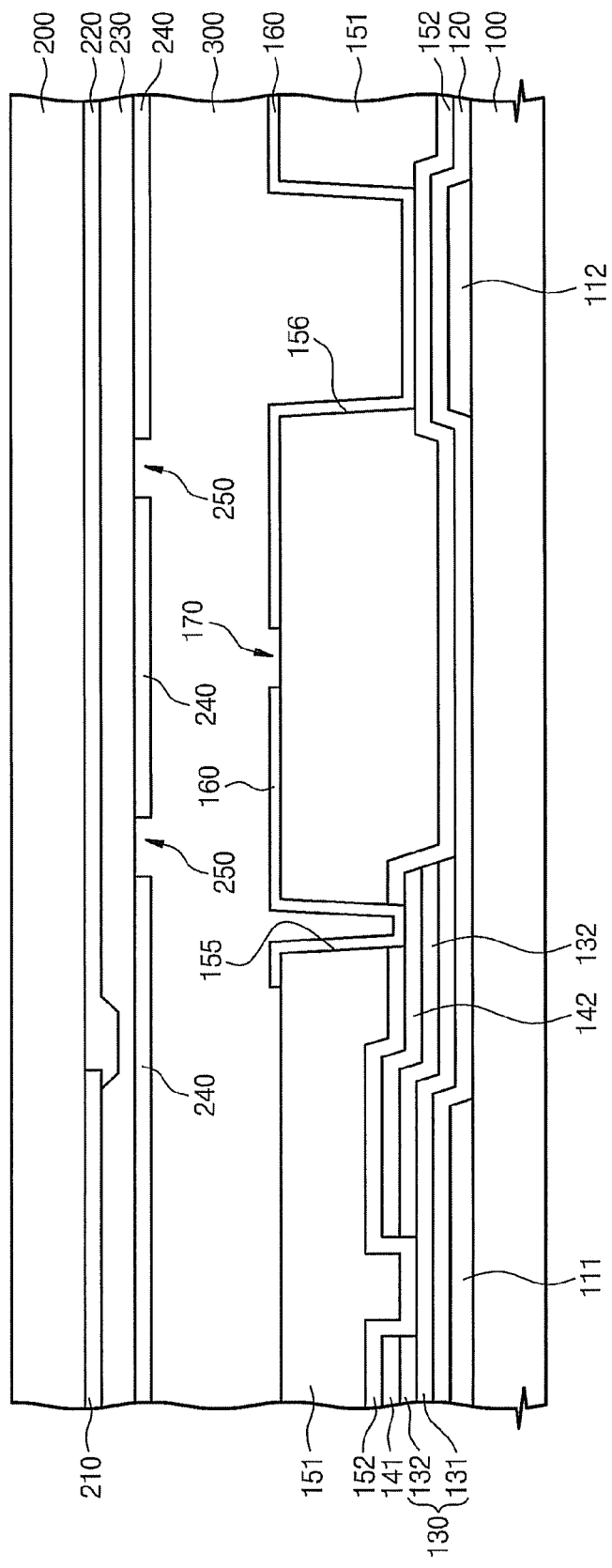
FIG. 10 is a cross-sectional view taken along line IV-IV' shown in FIG. 9.

FIG. 10 is a cross-sectional view taken along line IV-IV' shown in FIG. 9.

Referring to FIG. 10, a liquid crystal layer 300 is interposed between the first and second substrates 100 and 200. The gate electrode 111 and the storage electrode 112 are formed on the first substrate 100 and spaced apart from each other. The gate electrode 111 and the storage electrode 112 are covered by a gate insulating layer 120. A semiconductor layer pattern 130 is formed on the gate insulating layer 120 to partially overlap the gate electrode 111. The semiconductor layer pattern 130 includes an active layer pattern 131 and an ohmic contact layer pattern 132. The ohmic contact layer pattern 132 is separated into two parts. The source electrode 141 and the drain electrode 142 are formed on the two separated parts of the ohmic contact layer pattern 132, respectively.

The source electrode 141 and the drain electrode 142 are covered by a transparent insulating layer pattern 151, 152. The transparent insulating layer pattern 151, 152 is opened in a predetermined region to define a contact hole 155 exposing a portion of the drain electrode 142. The pixel electrode 160 is formed on the transparent insulating layer pattern 151, 152 and is electrically connected with the drain electrode 142 through the contact hole 155.

The transparent insulating layer pattern 151, 152 includes a first transparent insulating layer pattern 151 and a second transparent insulating layer pattern 152. The first transparent insulating layer pattern 151 includes an organic layer having a relatively thick thickness from about 3 to about 6 micrometers. The first transparent insulating layer pattern 151 lengthens a vertical distance between the data line 140 and the pixel electrode 160 to prevent the data line 140 and the pixel electrode 160 from being coupled with each other. The first transparent insulating layer pattern 151 may include an opened area 156 corresponding to the storage electrode 112. The second transparent insulating layer pattern 152 includes an inorganic layer. The second transparent insulating layer pattern 152 serves as a protection layer protecting a channel area between the source electrode 141 and the drain electrode 142 of the TFT 'T'.

The storage electrode 112, the pixel electrode 160 and the second transparent insulating layer pattern 152 form a storage capacitor. The first transparent insulating layer pattern 151 is opened at opened area 156 corresponding to the storage capacitor to increase a capacitance of the storage capacitor.

The second substrate 200 includes a light blocking layer pattern 210, a color filter 220 and an overcoat layer 230 formed thereon. The light blocking layer pattern 210 blocks a light passing through the second substrate 200 at a position corresponding to a boundary of the pixel area. The color filter 220 is formed on the light blocking layer pattern 210. The color filter 220 filters a white colored light into differently colored lights, such as a red colored light, a green colored light, and a blue colored light corresponding to a set of three colors, such as primary colors, thereby displaying an image with various colors. The overcoat layer 230 is formed on the color filter 220 to planarize a surface of the second substrate 200 and protect the color filter 220. The common electrode 240 is formed on the overcoat layer 230. The common electrode 240 is provided with the second domain divider 250 defined by removing a predetermined region of the common electrode 240.

Figure 11:
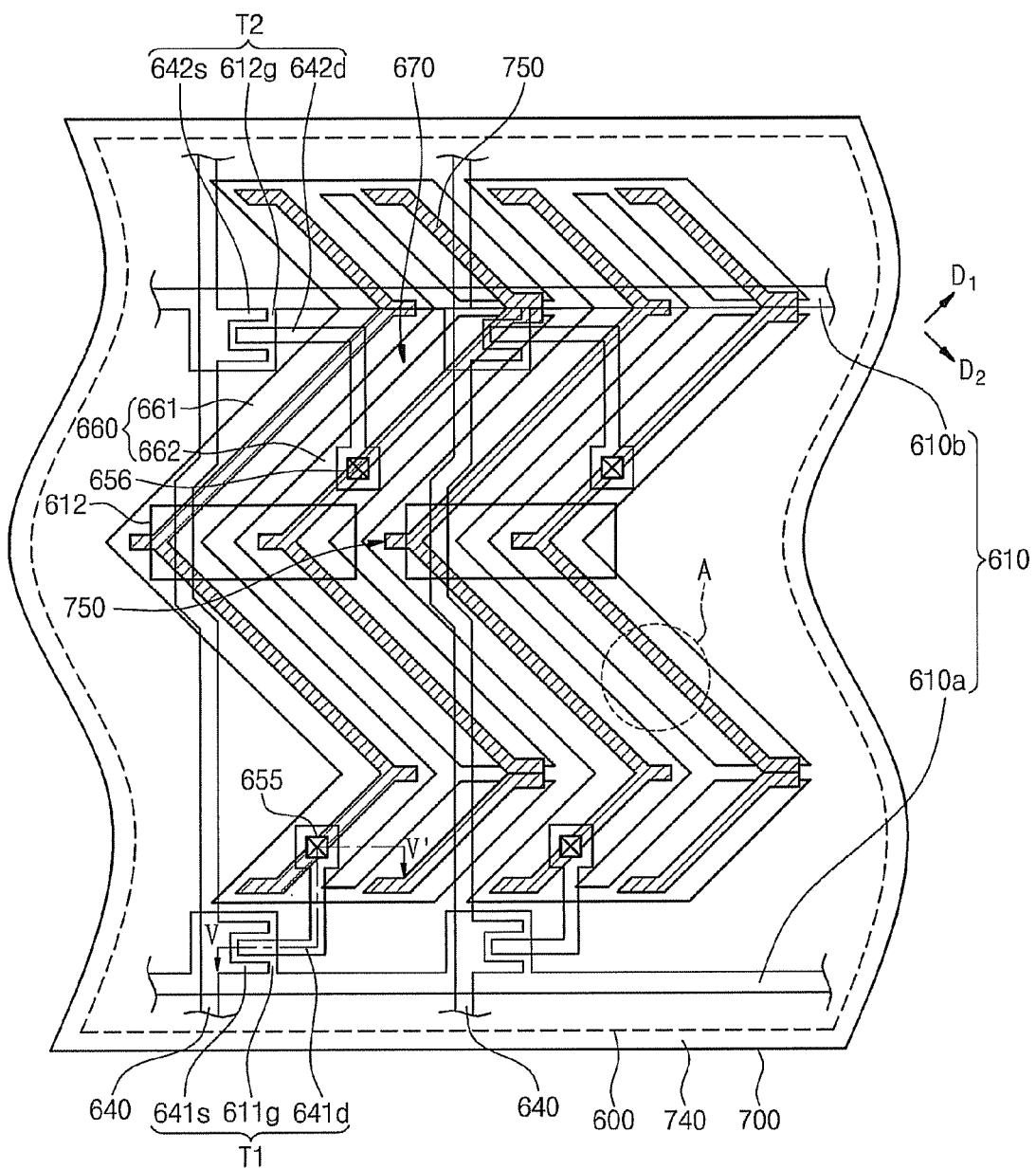
FIG. 11 is a plan view illustrating another exemplary embodiment of an LCD according to the present invention.

FIG. 11 is a plan view illustrating another exemplary embodiment of an LCD according to the present invention.

Referring to FIG. 11, the LCD includes first and second substrates 600 and 700. Pixel areas each of which has a same structure and function are defined on the first substrate 600. The first substrate 600 includes a gate line 610 and a data line 640, and a pixel electrode 660 is arranged in each pixel area. The pixel electrode 660 includes a first pixel electrode 661 and a second pixel electrode 662 spaced apart from the first pixel electrode 661. The gate line 610 includes a first gate line 610a and a second gate line 610b. The pixel electrode 660 extends in first and second directions D1 and D2 inclined relative to a longitudinal direction of the gate line 610 and symmetrical with each other, so that the pixel electrode 660 has a curved portion. Storage electrodes 612 may be formed on the first substrate 600, extending substantially parallel to the gate line 610, between the first and second gate lines 610a, 610b, and corresponding to a central region of the pixel electrode 660.

First and second TFTs T1 and T2 are arranged in each pixel area. The first TFT T1 includes a first gate electrode 611g branching from the first gate line 610a, a first source electrode 641s branching from the data line 640, and a first drain electrode 641d spaced apart from the first source electrode 641s. The first drain electrode 641d is electrically connected with the first pixel electrode 661 through the contact hole 655. The second TFT T2 includes a second gate electrode 612g branching from the second gate line 610b, a second source electrode 642s branching from the data line 640, and a second drain electrode 642d spaced apart from the second source electrode 642s. The second drain electrode 642d is electrically connected with the second pixel electrode 662 through the contact hole 656.

By an operation of the first TFT T1 and a second TFT T2, two different data voltages are applied to the first and second pixel electrodes 661 and 662, respectively. The LCD has two different optical characteristics corresponding to the first and second pixel electrodes 661 and 662, respectively. As a result, two different optical characteristics compensate with each other, to thereby increase an image quality of the LCD.

The second substrate 700 includes a common electrode 740 formed thereon. The pixel electrode 660 and the common electrode 740 are provided with a first domain divider 670 and a second domain divider 750, respectively. The first and second domain dividers 670 and 750 are spaced apart from each other in a plan view and have portions that extend substantially parallel to each other. The first domain divider 670 is positioned along with a gap between the first and second pixel electrodes 661 and 662. The second domain divider 750 is positioned at a center portion of the first and second pixel electrodes 661 and 662.

Figure 12:
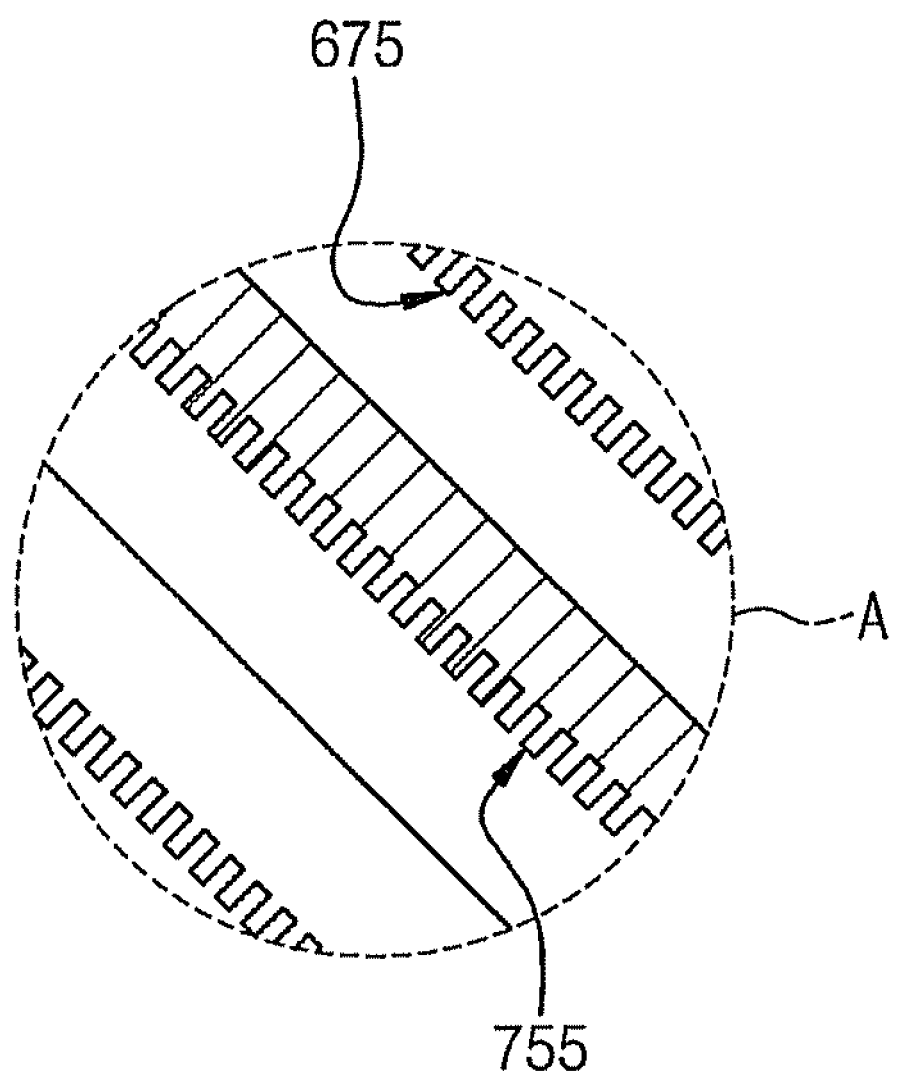
FIG. 12 is an enlarged view of portion 'A' in FIG. 11.

As illustrated by an enlarged view shown in FIG. 12, the pixel electrode 660 includes a first concavo-convex portion 675 corresponding to the first domain divider 670. The first concavo-convex portion 675 is also formed at an end portion of the pixel electrode 660. The common electrode 740 includes a second concavo-convex portion 755 corresponding to the second domain divider 750. The first and second concavo-convex portions 675 and 755 are alternately arranged with each other.

In an exemplary embodiment, the first and second concavo-convex portions 675 and 755 extend to end portions of the first and second domain dividers 670 and 750 along the first and second directions D1 and D2. As a result, a controlling force for alignment of the liquid crystals may be supplemented over a whole area of the pixel area.

A vertical structure of the LCD, such as a cross-sectional view, according to the present exemplary embodiment is similar to that of the previous described embodiment except for using two transistors instead of using one transistor. In addition, a vertical structure corresponding the first TFT T1 is similar to a vertical structure corresponding to the second TFT T2. Therefore, only the structure corresponding to the first TFT T1 will be described as follows.

Figure 13:
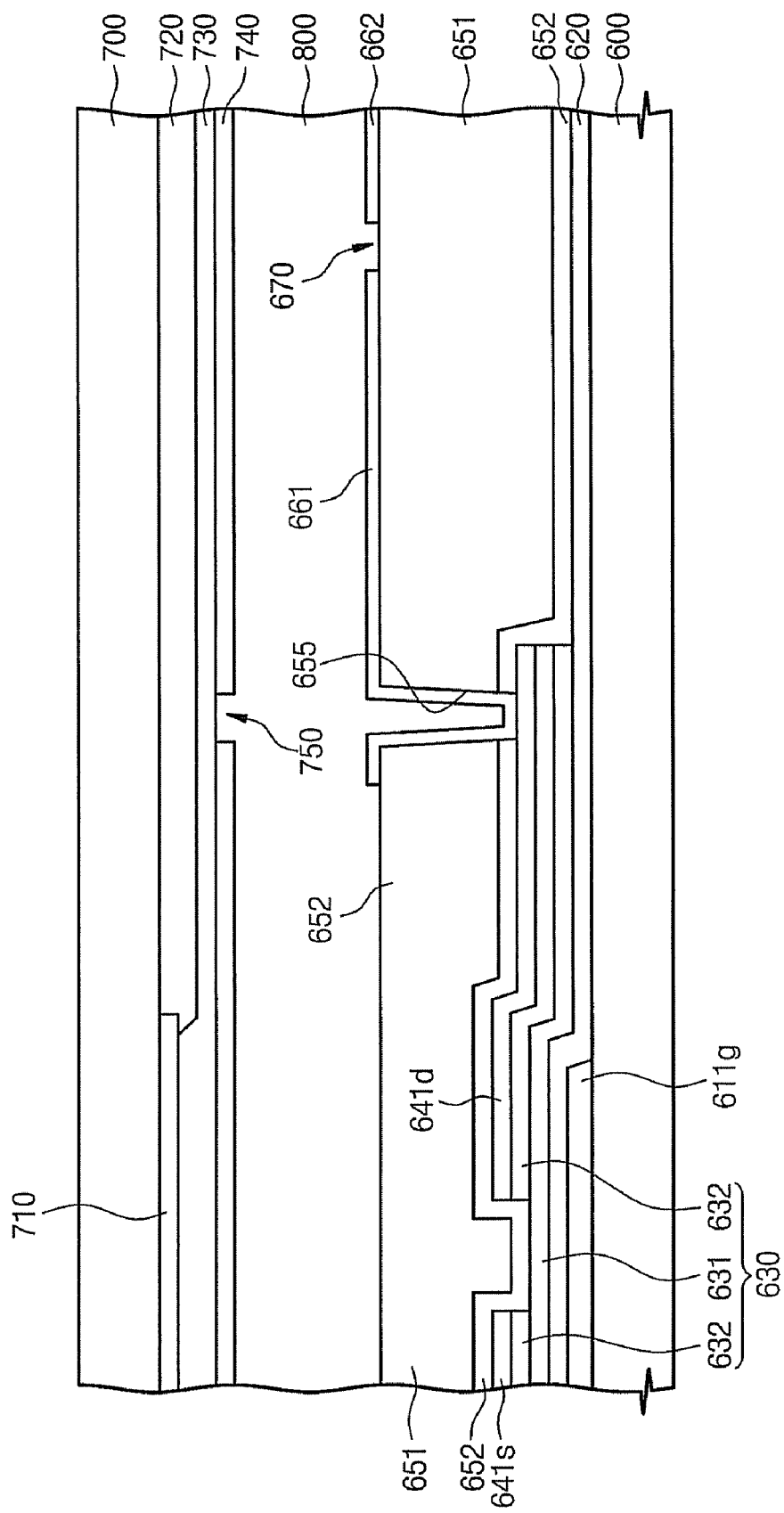
FIG. 13 is a cross-sectional view taken along line V-V' shown in FIG. 11.

FIG. 13 is a cross-sectional view taken along line V-V' shown in FIG. 11.

Referring to FIG. 13, the first TFT T1 includes the first gate electrode 611g, a gate insulating layer 620, a semiconductor layer pattern 630 including an active layer pattern 631 and an ohmic contact layer pattern 632, the first source electrode 641s, and the first drain electrode 641d, which are disposed sequentially on the first substrate 600. The first TFT T1 is covered by a first transparent insulating layer pattern 651 including an organic material and a second transparent insulating layer pattern 652 including an inorganic material. The first and second pixel electrodes 661 and 662 are formed on the first and second transparent insulating layer patterns 651 and 652. The first and second pixel electrodes 661 and 662 are spaced apart from each other. The first pixel electrode 661 is connected to the first drain electrode 641d through the contact hole 655. The first domain divider 670 is positioned along with a gap between the first and second pixel electrodes 661 and 662.

The second substrate 700 includes a light blocking layer pattern 710, a color filter 720, an overcoat layer 730, and the common electrode 740 formed thereon. The second domain divider 750 includes a cut-out section, however may alternatively include a protrusion as previously described. The first and second substrates 600 and 700 are provided with a liquid crystal layer 800 interposed therebetween, and the liquid crystal layer 800 includes the liquid crystals.

According to the present invention, the LCD may properly control the alignment of the liquid crystals, to thereby widen the viewing angle and display a high quality image.

Although exemplary embodiments of the present invention have been described, it is understood that the present invention should not be limited to these exemplary embodiments but various changes and modifications can be made by one having ordinary skill in the art within the spirit and scope of the present invention as hereinafter claimed.

What is claimed is:

1. A liquid crystal display comprising:
   a first substrate having a pixel area;
   a second substrate facing the first substrate;
   a liquid crystal layer interposed between the first and second substrates;
   a gate line and a data line arranged on the first substrate and crossing each other;
   a pixel electrode arranged in the pixel area and provided with a first domain divider; and
   a common electrode arranged on the second substrate and provided with a second domain divider, the first and second domain dividers dividing the pixel area into a plurality of domains,
   wherein the second domain divider extends in a first direction and a second direction symmetric with the first direction with respect to a longitudinal direction of the gate line in order to have a curved portion of the second domain divider, the common electrode has a concavo-convex portion in a saw-toothed shape in a plan view of the common electrode, and the concavo-convex portion is positioned in a region where the curved portion is formed.

2. The liquid crystal display of claim 1, wherein the concavo-convex portion is formed in a region where an included angle between the first direction and the second direction is greater than 180 degrees.

3. The liquid crystal display of claim 1, wherein the first domain divider is spaced apart from the second domain divider and portions of the first domain divider extend substantially parallel to portions of the second domain divider in order to have a curved portion of the first domain divider, the pixel electrode has a concavo-convex portion in a saw-toothed shape in a plan view of the pixel electrode, and the concavo-convex portion is positioned corresponding to the curved portion of the first domain divider.

4. The liquid crystal display of claim 3, wherein the concavo-convex portion of the common electrode and the concavo-convex portion of the pixel electrode are formed in a region where an included angle between the first direction and the second direction is greater than 180 degrees.

5. The liquid crystal display of claim 3, wherein the concavo-convex portion of the common electrode and the concavo-convex portion of the pixel electrode are alternately arranged with each other.

6. The liquid crystal display of claim 3, wherein the concavo-convex portion of the common electrode and the concavo-convex portion of the pixel electrode are arranged to an end portion of the first and second domain dividers, respectively.

7. The liquid crystal display of claim 3, wherein the saw-toothed shape of the concavo-convex portion of the common electrode and the concavo-convex portion of the pixel electrode is protruded toward a direction substantially perpendicular to the first direction in a region where the first and second domain dividers extend in the first direction and is substantially perpendicular to the second direction in a region where the first and second domain dividers extend in the second direction.

8. The liquid crystal display of claim 3, wherein the pixel electrode extends in the first and second directions and is curved in a curved region where a first extending portion of the pixel electrode in the first direction meets a second extending portion of the pixel electrode in the second direction.

9. The liquid crystal display of claim 8, wherein the concavo-convex portion of the pixel electrode is positioned corresponding to the curved region of the pixel electrode.

10. The liquid crystal display of claim 1, further comprising a storage electrode spaced apart from the gate line and overlapped with the curved portion in a plan view of the liquid crystal display.

11. The liquid crystal display of claim 10, further comprising a first transparent insulating layer pattern arranged between the data line and the pixel electrode, and partially opened in an area corresponding to the storage electrode.

12. The liquid crystal display of claim 11, wherein the concavo-convex portion is successively formed along an area corresponding to the storage electrode to an area corresponding to an end portion of the storage electrode.

13. The liquid crystal display of claim 11, wherein the first domain divider is spaced apart from the second domain divider and portions of the first domain divider extend substantially parallel to portions of the second domain divider in order to have a curved portion of the first domain divider, and the pixel electrode has a concavo-convex portion in a saw-toothed shape in a plan view of the pixel electrode, and the concavo-convex portion of the pixel electrode is positioned corresponding to the curved portion of the first domain divider.

14. The liquid crystal display of claim 13, wherein the concavo-convex portion of the pixel electrode is successively formed along an area corresponding to the storage electrode to an area corresponding to an end portion of the storage electrode.

15. The liquid crystal display of claim 11, further comprising a second transparent insulating layer pattern arranged between the storage electrode and the first transparent insulating layer pattern to cover the storage electrode.

16. The liquid crystal display of claim 15, wherein the first transparent insulating layer pattern is thicker than the second transparent insulating layer pattern and comprises an organic material, and the second transparent insulating layer pattern comprises an inorganic material.

17. The liquid crystal display of claim 1, wherein the first domain divider is defined by a cut-out section obtained by removing a portion of the pixel electrode.

18. The liquid crystal display of claim 17, wherein the second domain divider is defined by a cut-out section obtained by removing a portion of the common electrode.

19. The liquid crystal display of claim 17, wherein the second domain divider is defined by a protrusion formed on a portion of the common electrode.

20. A method of improving a viewing angle of a liquid crystal display, the method comprising:
    forming a first domain divider in a pixel electrode;
    forming a second domain divider in a common electrode, the second domain divider spaced from the first domain divider in a plan view of the liquid crystal display, the second domain divider having a first portion extending in a first direction and a second portion extending in a second direction, the second portion meeting the first portion at a curved portion of the second domain divider;
    forming a concavo-convex portion in the common electrode at least at a region corresponding to the curved portion of the second domain divider;
    wherein a convex portion of the concavo-convex portion supplements a controlling force of the second domain divider over liquid crystals in the liquid crystal display and a concave portion of the concavo-convex portion increases an aperture ratio of the liquid crystal display.

* * * * *